Feb. 2, 1932.                R. A. FORESMAN                1,843,273
                          ASH DISPOSAL APPARATUS
                          Filed July 13, 1929       7 Sheets-Sheet 1

Inventor
Robert A. Foresman

By  A. B. Reavis
           Attorney

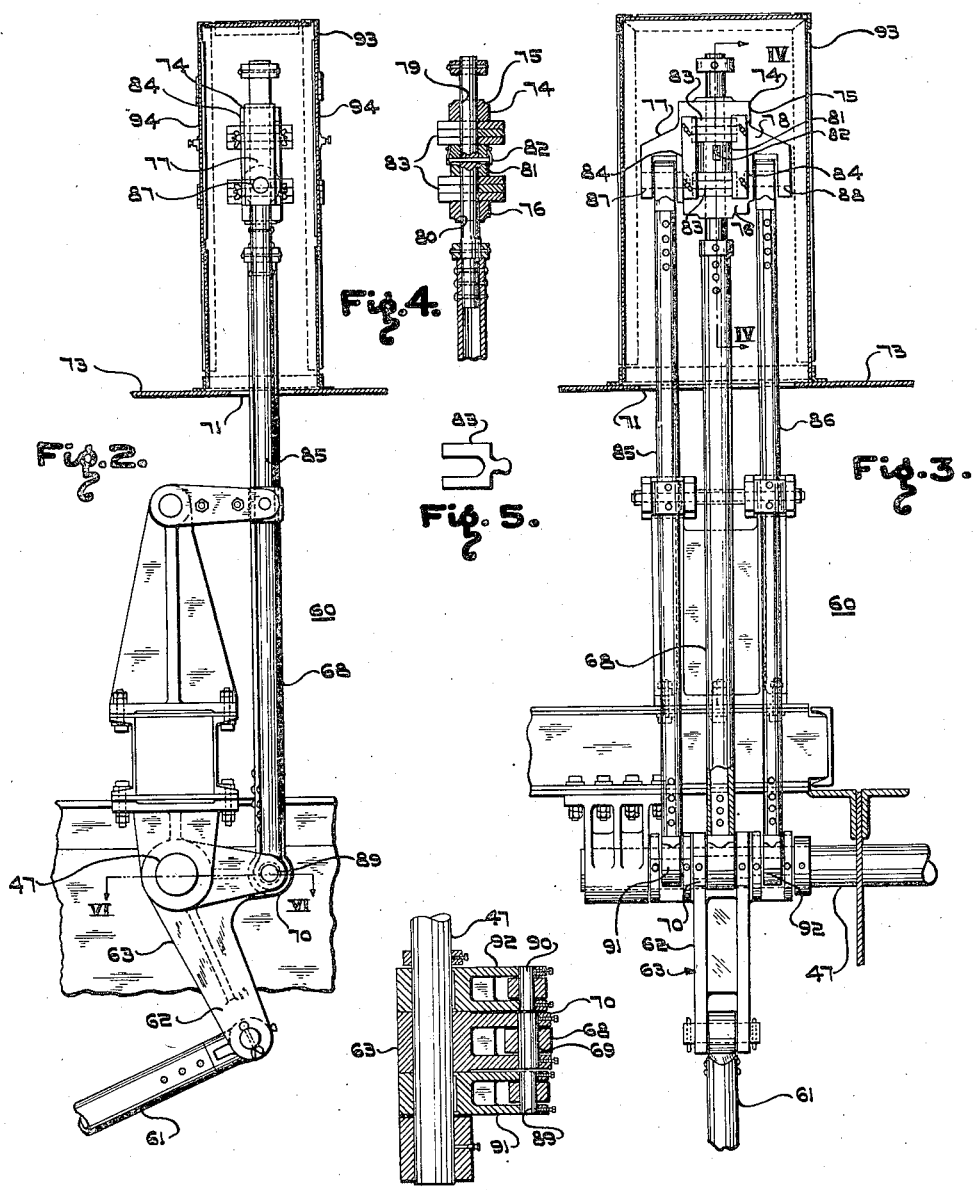

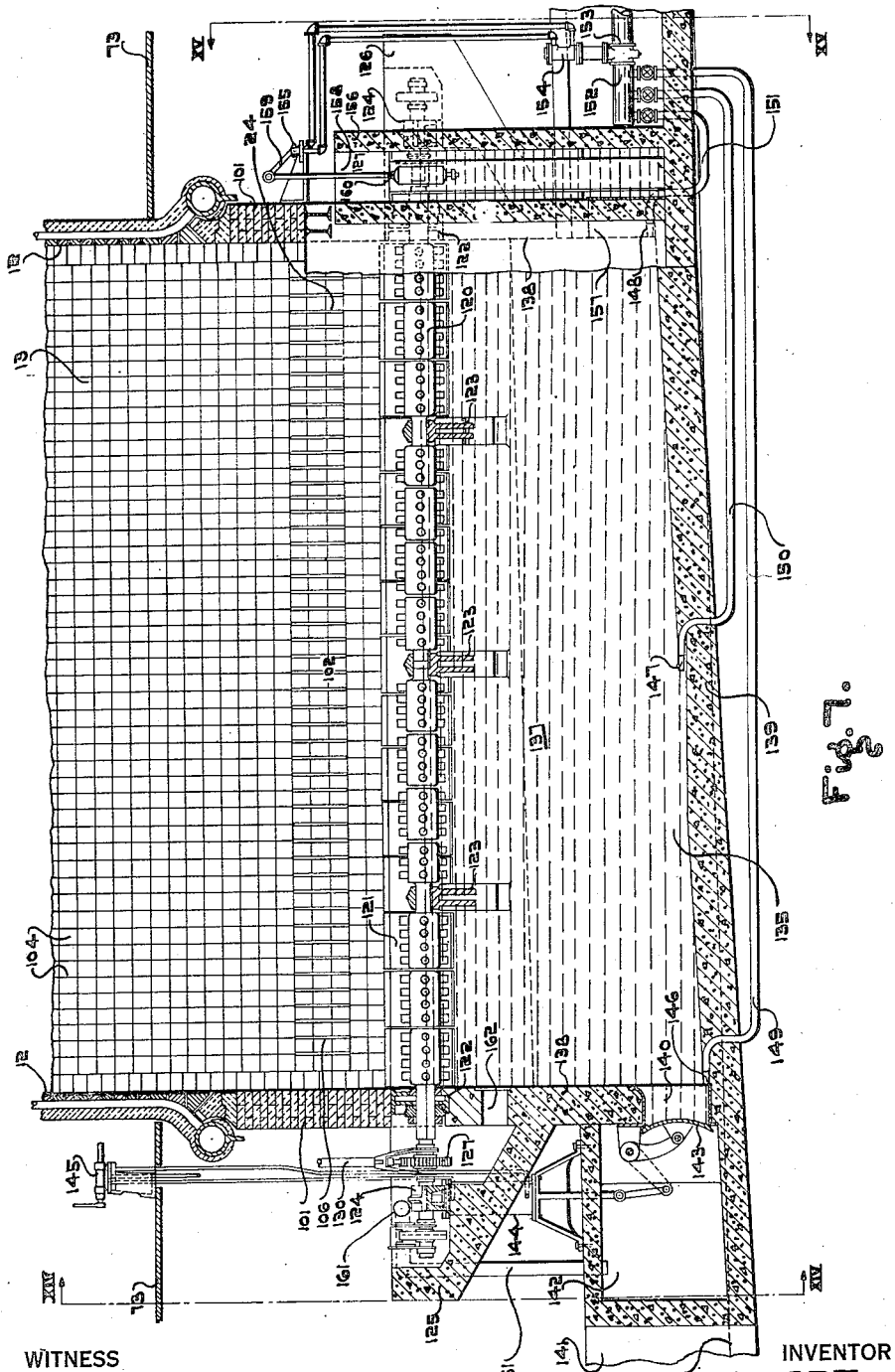

Feb. 2, 1932.  R. A. FORESMAN  1,843,273
ASH DISPOSAL APPARATUS
Filed July 13, 1929  7 Sheets-Sheet 4
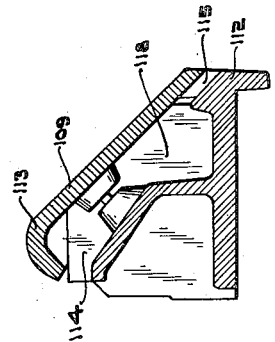
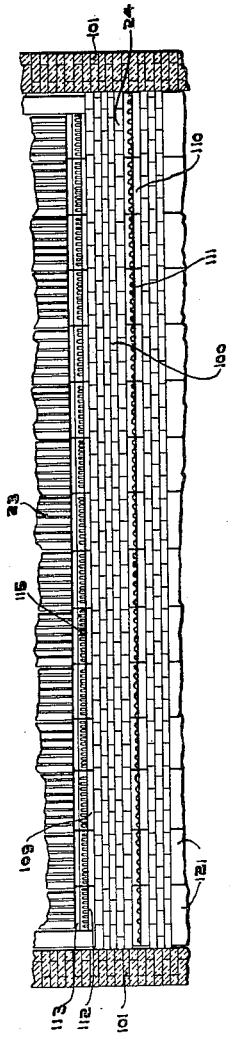
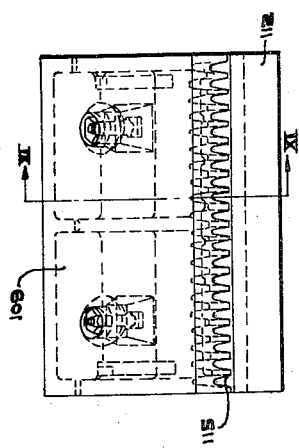
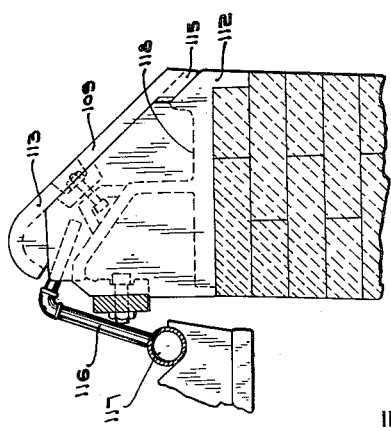
INVENTOR
Robert A. Foresman
BY
a. B. Reavis
ATTORNEY

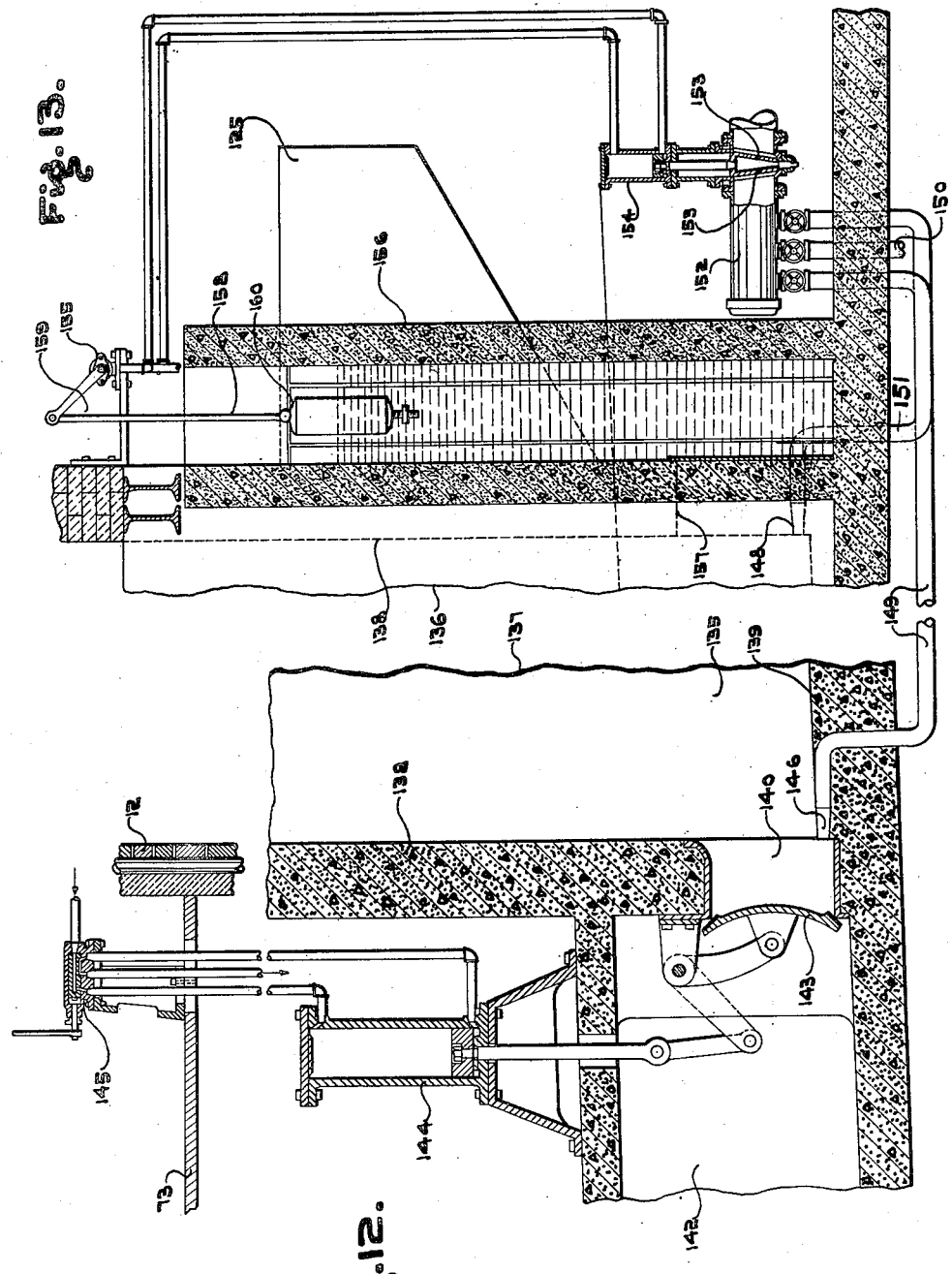

Feb. 2, 1932.   R. A. FORESMAN   1,843,273
ASH DISPOSAL APPARATUS
Filed July 13, 1929   7 Sheets-Sheet 6
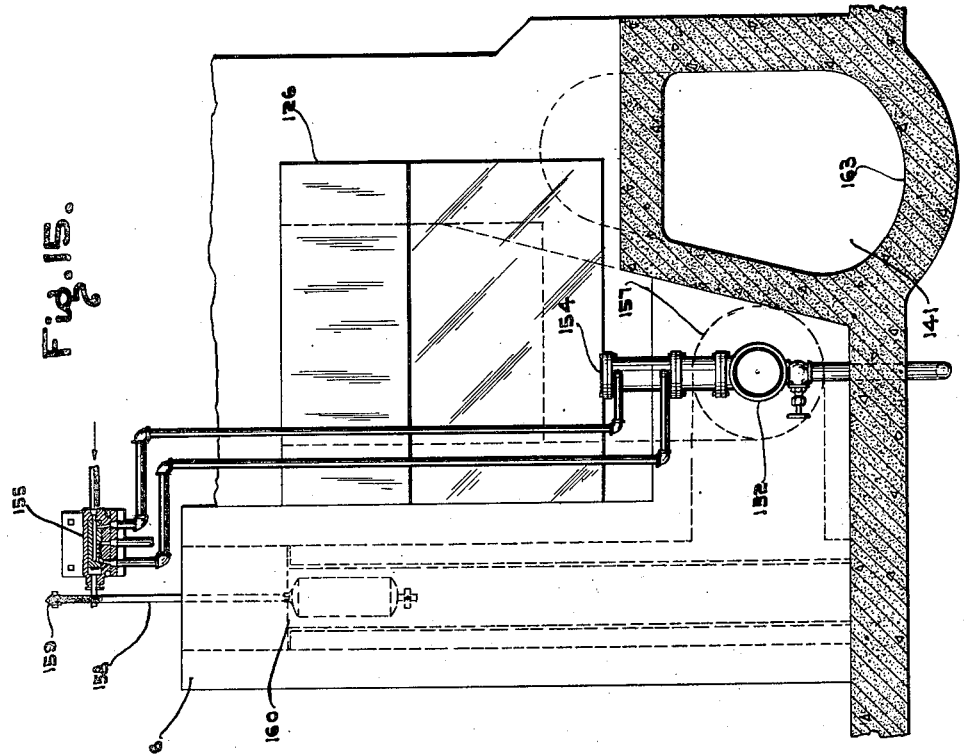
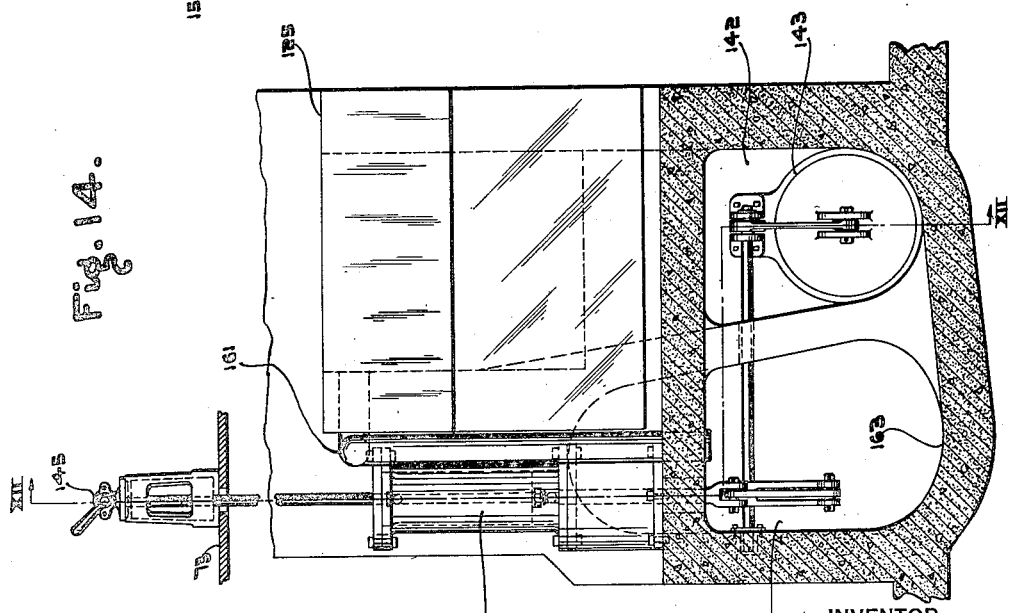

Feb. 2, 1932.  R. A. FORESMAN  1,843,273
ASH DISPOSAL APPARATUS
Filed July 13, 1929   7 Sheets-Sheet 7
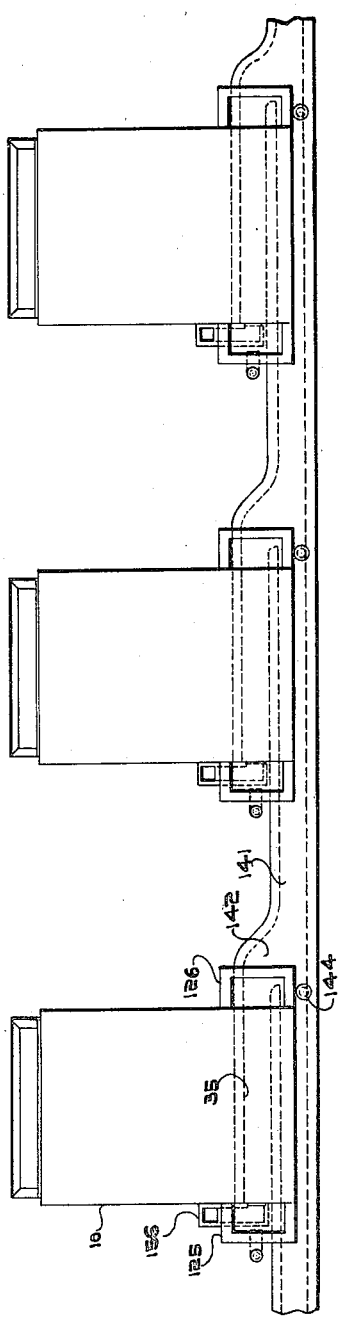
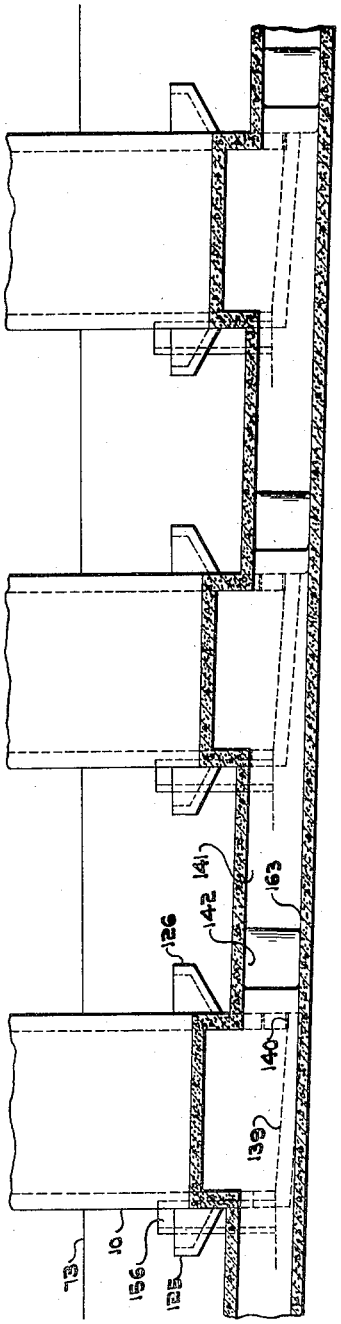
WITNESS
E. Lutz
INVENTOR
Robert A. Foresman.
BY
A. B. Ravis
ATTORNEY Patented Feb. 2, 1932

1,843,273

UNITED STATES PATENT OFFICE

ROBERT A. FORESMAN, OF MOORES, PENNSYLVANIA, ASSIGNOR TO WESTINGHOUSE ELECTRIC & MANUFACTURING COMPANY, A CORPORATION OF PENNSYLVANIA

ASH DISPOSAL APPARATUS

Application filed July 13, 1929. Serial No. 378,103.

My invention relates to combustion apparatus and more particularly to ash disposal apparatus therefor, and it has for an object to provide both an improved method and an improved apparatus for disposing of ash and refuse from all kinds of fuel burning structure. This application is a continuation in part of my copending application, Serial No. 337,445, filed February 4, 1929, and assigned to the Westinghouse Electric & Manufacturing Company.

The design of present day stokers and ash-disposal apparatus is such as to necessitate the provision of a very large basement space due to basement height; and, my invention makes possible more economical building construction in that, due to my novel apparatus and arrangement thereof, the required basement height or head room may be materially reduced. The ash-disposal apparatus usually comprises a clinker pit disposed at the discharge end of the stoker, an ash or storage pit disposed directly beneath the clinker pit, and either a hydraulic or a mechanical conveying apparatus disposed beneath the ash pit. In the dump grate type of stoker, the clinker pit is, of course, omitted. However, in either type, each element of the ash-disposal apparatus heretofore known to me requires a large amount of head room in the basement.

In the clinker pit type, an appreciable amount of combustion takes place in and over the clinker pit. Air is usually admitted to the pit for supporting this combustion, and in order that the air may flow upward, it is necessary to maintain a substantial head of ash adjacent the grinder rolls for sealing the lower end of the pit. Another reason for the head of ash is that it is necessary for the ash to cool to a temperature sufficiently low so as not to harm the rolls. All of this necessitates the provision of a relatively deep clinker pit.

In both the dump grate and the clinker pit type, large and deep ash pits are usually provided for receiving and storing the ash. They are arranged beneath the dump grates or clinker pits and are provided in their bottom walls with movable doors or gates for emptying the ash into railroad cars or into hydraulic sluices for conveying the ash away. In cases where mechanical systems are used for removing the ash from the ash pit, such pit has to be of large capacity in order to insure the continuous operation of the stoker should the mechanical system fail. Also it has been necessary to provide large ash pits in connection with all hydraulic systems for removing ash heretofore known to me, for the reason that such systems have not proven to be free from failure. Furthermore prior hydraulic systems are provided with specially constructed discharge hoppers or conduits, which are disposed beneath the discharge openings in the ash pit and are for the purpose of conveying the ash from the pit to a main sluice and at the same time maintaining an ash seal to prevent the admission of air to the ash pit. Obviously, therefore, either of these systems require an appreciable amount of additional head room in the basement.

Due to the construction of the prior hydraulic systems, it is necessary that the outward flow of ash be maintained at a certain predetermined rate, for if this rate is exceeded the system will become clogged. In order that this rate be maintained, it is necessary that considerable care and skill be exercised during the emptying operation. Furthermore, even though considerable care is exercised by a skilled operator, a relatively long period of time is utilized in emptying the ash pits by the prior methods.

It is therefore an object of this invention to provide an improved form of combustion apparatus, the component parts of which are constructed and arranged and cooperate with one another to require an extremely small amount of head room.

Another object is to provide an improved form of ash pit which is designed to effectively eject the ashes therefrom with the minimum requirement for height.

A further object of my invention is to provide an improved method for quickly and effectively disposing of the ash from fuel burning structures.

A still further object is to provide an improved arrangement of sluices and ash pits for servicing a plurality of furnaces the construction of which is such as to require a minimum amount of head room in the basement.

These and other objects are effected by my invention as will be apparent from the following description and claims taken in connection with the accompanying drawings, forming a part of this application, in which Fig. 1 is a longitudinal sectional view showing a stoker and ash-disposal apparatus constructed in accordance with my invention;

Fig. 2 is a fragmentary side elevation illustrating mechanism for operating the overfeed grate section of the stoker shown in Fig. 1;

Fig. 3 is a view taken at right angles to Fig. 2;

Fig. 4 is a fragmentary section taken on the line IV—IV of Fig. 3;

Fig. 5 is a detail view illustrating one of the lost-motion adjusting shoes;

Fig. 6 is a fragmentary section taken on the line VI—VI of Fig. 2;

Fig. 7 is a vertical, longitudinal sectional view illustrating the clinker and ash pits, the section being taken on an irregular line so as to include certain elements upon which the operation of my improved apparatus is dependent.

Fig. 8 is a fragmentary section taken on the line VIII—VIII of Fig. 1 and showing the interior face of the front wall of the clinker pit;

Fig. 9 is an enlarged fragmentary sectional view of the upper portion of the front wall of the clinker pit illustrating in elevation one of the combined air and water, box-like castings;

Fig. 10 is a rear elevation of the casting shown in Fig. 9;

Fig. 11 is a sectional view taken on the line XI—XI of Fig. 10;

Fig. 12 is an enlarged fragmentary sectional view illustrating the left-hand portion of the apparatus shown in Fig. 7 and taken on the broken section line XII—XII of Fig. 14;

Fig. 13 is an enlarged fragmentary sectional view of the apparatus shown at the right-hand portion of Fig. 7;

Fig. 14 is an enlarged fragmentary sectional view taken on the line XIV—XIV of Fig. 7;

Fig. 15 is an enlarged fragmentary section taken on the line XV—XV of Fig. 7;

Fig. 16 is a diagrammatic view illustrating in plan, a battery of stoker-fired furnaces equipped with my improved form of ash-disposal apparatus; and, Fig. 17 is a diagrammatic view illustrating in side elevation the apparatus shown in Fig. 16, the main sluice being shown in section.

Figure 1:
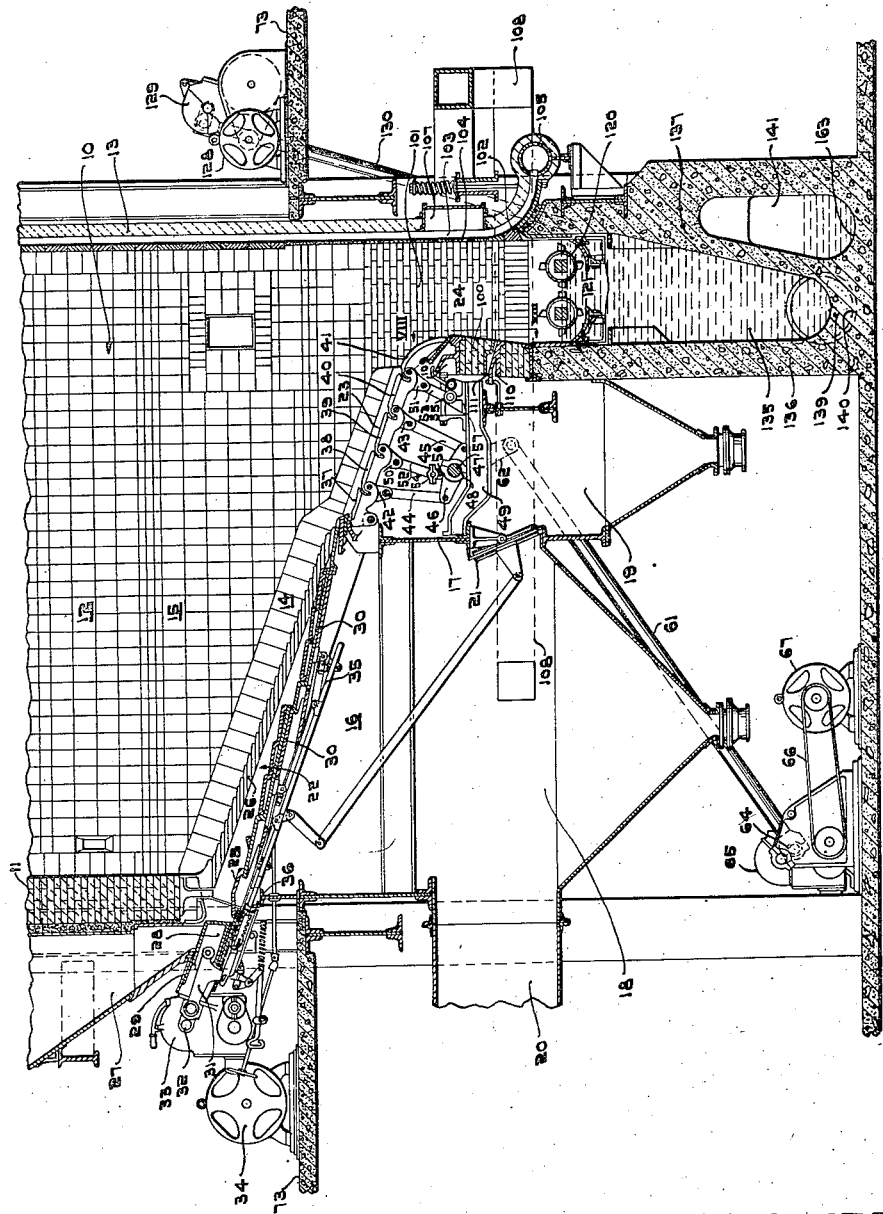

According to a detailed aspect of my invention, I provide at the end of a progressive feed stoker, a relatively shallow clinker pit including grinder rolls disposed in the lower portion thereof. The walls of the pit are immovable and gas-tight and the interior surfaces thereof are smooth so that a minimum amount of resistance will be offered to the downward movement of the refuse. Means is provided for maintaining the front and rear walls in a cool condition and for at least partially submerging the grinder rolls so that clinkers will not adhere to the side walls and the grinder rolls will not be exposed to the destructive action of the hot material in the pit. Furthermore, air under pressure is admitted to the interior of the pit so as to hasten the burning out of any remaining combustible.

A relatively-shallow ash pit of improved form is disposed below the refuse grinding mechanism and comprises upright side walls which are in effect continuations of the clinker pit walls, and a downwardly inclined bottom wall having a plurality of fluid jets therein. One of the upright walls is provided with a discharge opening at its lower end, and the fluid jets are so disposed as to direct fluid under pressure against the ash so as to undermine and effect the movement of the latter through the discharge opening. Suitable valve means is disposed within the discharge opening for opening and closing the same.

A main sluice is provided which extends substantially parallel to the ash pit and is so arranged that its bottom wall is offset and spaced a slight distance below the ash discharge opening thereby requiring a minimum amount of head room. Suitable conduit means is provided for conducting the ash from the discharge opening to the main sluice.

Mechanism is provided for controlling the fluid jets so that they operate to maintain a body of water within the ash pit with an upper level adjacent the refuse discharge mechanism of the clinker pit. This mechanism provides for the flow of the fluid through the jets until the ash pit has been filled and the desired level attained, and also provides for the opening of the jets when the level of the water falls below the desired point. It will thus be seen that when the valve means controlling the discharge opening of the ash pit is opened, both the head of water within the ash pit and the fluid issuing under high velocity from the jets will act to force the refuse from the ash pit and into the main sluice.

According to another aspect of my invention, I provide an improved method for disposing of the ash coming from fuel burning structures. This method comprises essentially the following steps: (1) supplying ash or refuse from the fuel burning structure into an impounded body of water so as to produce a fluent mixture; (2) periodically discharging the body of water and refuse; (3) agitating and maintaining the fluency of the mixture as it is discharged by directing into the mixture additional water at high velocity; and, (4) replenishing the body of water. By reason of this method, the refuse may be very quickly and effectively removed from the fuel burning structure by an unskilled operator.

Referring now in detail to the accompanying drawings and particularly to Fig. 1, it will be observed that I have shown a furnace 10 having a front wall 11, side walls 12 and rear wall 13. A progressive feed stoker 14 is disposed within the furnace and divides the latter into a combustion chamber 15 and an air chamber 16.

The air chamber 16 is divided by a transversely-extending supporting structure 17 into a front air chamber 18 and a rear air chamber 19. A conduit 20 supplies air under pressure to the front air chamber 18 and the rear chamber 19 receives air from the front chamber through a damper-controlled opening 21.

The progressive feed stoker 14 comprises a multiple retort underfeed section 22, an overfeed section 23 for receiving the burning material discharged from the underfeed section, and a clinker pit 24 disposed to receive the ash and burning material from the lower end of the overfeed section.

The underfeed section 22 comprises a plurality of retorts 25 and tuyère rows 26. Green coal is fed from a hopper 27 to the upper ends of the retorts 25 by means of primary rams 28 reciprocating within ram boxes 29. The coal is fed longitudinally of the retorts 25 by means of secondary rams 30. The action of the secondary ram is such as to also feed the coal upwardly over the tuyère rows 26, which latter supply the air for supporting combustion.

The primary ram 28 is operated by a connecting rod 31, which latter is driven from a crank shaft 32 of speed-reducing gearing disposed within a box 33. Motion is imparted to the speed-reducing gearing by suitable power means, for example, an electric motor 34. The secondary rams 30 are driven from a rod 35 connected at its upper end by means of a lost-motion mechanism 36 to the connecting rod 31 which drives the primary ram.

The overfeed grate section 23 comprises a series of grate members 37, 38, 39, 40 and 41 pivotally connected together in end-to-end relation and extending in the direction of fuel feed. The grate members provide, under all conditions of operation, an unbroken fuel-supporting surface and are operated in such a manner as to both agitate the burning material as it comes from the underfeed section so as to permit the air for supporting combustion to penetrate the fuel bed, and to feed the burning material and ash coming from the underfeed section, in a positive and continuous manner thereover and into the clinker pit.

The grate member 37 is pivotally supported at its upper end to a suitable portion of the stoker-supporting structure. The grate member 41 is slidably supported at its rear end upon the front wall of the clinker pit.

The grate members 37 and 39 are provided at their rear ends with downwardly-extending lugs 42 and 43, respectively. These lugs are pivotally connected to the upper ends of power links 44 and 45. The lower ends of the power links are pivotally connected to the opposite ends of a rocker arm 46 keyed to a power shaft 47, which latter extends transversely of the rear air chamber 19 and is supported by bearings 48 carried by suitable supporting beams 49.

The grate members 38 and 40 are provided at their rear ends with downwardly-extending lugs 50 and 51, respectively, and these lugs are pivotally connected to the upper ends of floating supporting links 52 and 53. The lower ends of the supporting links are pivotally connected to suitable supporting shafts 54 and 55, which latter are mounted in stationary supports 56 and 57, respectively.

An oscillatory movement imparted to the power shaft 47 will result in an up and down movement of the power links 44 and 45, and as the latter are connected to grate members 37 and 39, respectively, the overfeed grate section will also move up and down at the points of connection with the links. This up and down movement will result in a bodily movement of the grate members 38, 39, 40 and 41 in the direction of fuel feed. The floating links 52 and 53, and the slidable support for the grate member 41 permits such bodily movement.

The angular movement imparted to the grate members by means of the power links will result in a breaking up of the burning material received from the underfeed section, and the movement of the grate members bodily in the direction of the fuel feed will result in a positive and continuous feeding of the fuel over the overfeed grate section and into the clinker pit. Air for supporting combustion passes up through the overfeed section and into the fuel bed.

Oscillatory motion is imparted to the power shaft 47 by means of an adjustable lost motion driving mechanism 60 disposed exteriorly of the furnace and connected to an extension of the power shaft. (See Figs. 1 to 6, inclusive.) The lost motion driving mechanism is operated from a connecting rod 61 connected at its upper end to an arm 62 of a bell crank 63 loosely mounted on the outer end of the power shaft 47. The lower end of the connecting rod is driven from a crank shaft 64 of a speed reduction unit 65, and the latter is driven by a chain 66 from a suitable electric motor 67.

A rod 68 is pivotally connected at its lower end by a pin 69 (Fig. 6) to the outer end of a second arm 70 of the bell crank 63. The rod 68 extends upwardly through an opening 71 in the operating floor 73 of the furnace room.

A yoke 74 is loosely mounted upon the upper end of the rod 68. The yoke 74 is in form of an integral casting having upper and lower abutments 75 and 76, and laterally-extending arms 77 and 78. The abutments 75 and 76 have aligned openings 79 and 80, respectively, which loosely receive the rod 68.

A collar 81 is secured by means of a shearing pin 82, to the upper end of the rod 68. The collar is mounted on the rod 68 between the abutments 75 and 76. A plurality of adjusting shoes 83 are disposed between the collar 81 and each of the abutments 75 and 76, and are held in position by detachable plates 84 (Fig. 3) secured to the yoke 74. The adjusting shoes serve to transmit the motion from the rod 68 to the abutments 75 and 76 of the yoke.

Rods 85 and 86 are connected at their upper ends by pins 87 and 88 to the outer ends of the arms 77 and 78 of the yoke. The lower ends of the rods 85 and 86 are pivotally connected by pins 89 and 90 to the outer ends of lever arms 91 and 92. The inner ends of the lever arms 91 and 92 are keyed to the power shaft 47 (see Fig. 6).

It will thus be seen that motion imparted to the bell crank 63 by the connecting rod 61, will be transmitted through the rod 68, collar 81, adjusting shoes 83, abutments 75 and 76, arms 77 and 78, rods 85 and 86 and lever arms 91 and 92 to the power shaft 47. Varying degrees of lost motion may be had by removing or inserting any desired number of the adjusting shoes 83.

Should, for any reason, the grate members or the operating mechanism therefor become jammed, the shearing pin 82 will fail and permit free movement of the rod 68. This arrangement will thereby prevent any damage to the parts.

The upper ends of the rods 68, 85 and 86, and the yoke 74 are disposed above the operating floor 73, thus affording easy access to the parts for the purpose of adjustment. A housing 93 encloses the upper ends of the rods and yoke, and is provided with doors 94, through which the parts may be easily reached.

As stated, the clinker pit 24 is disposed to receive the burning material and ash discharged from the overfeed section 23, and operates to burn out the combustible in such material and remove the same from the furnace. (See Figs. 1, 7 and 8.) The clinker pit comprises immovable front, end and rear walls 100, 101 and 102, respectively. The walls of the clinker pit are gas-tight in construction and are provided with smooth inner surfaces so as to offer the least possible resistance to the downward movement of the material therein. Means is provided for cooling both the front wall 100 and the rear wall 102 so as to prevent the destructive action thereon of the burning material within the pit. The end walls 101 are constructed of any suitable refractory material, for example, fire brick.

The rear wall is preferably composed of a plurality of spaced upright water tubes 103, and refractory material, for example, cast iron blocks 104 secured to the tubes at the clinker pit side thereof. The lower end of the tubes are connected by a suitable header 105 extending transversely of the rear of the furnace. Water circulating through the tubes 103 acts to absorb heat from the refuse within the pit and maintain the wall in a cooled condition.

Any suitable means may be employed for supplying air under pressure to the interior of the pit. Preferably, air is introduced through the walls of the pit. As shown, openings 106 are provided through the refractory blocks of the rear wall to provide passages for such air. An air manifold 107 extends transversely of the rear wall 102 at the rear of the openings 106, and air under pressure is supplied to the manifold from the front air chamber 18 by means of a suitable conduit 108.

The front wall 100 is also immovable and is constructed of any suitable refractory material, for example, fire brick and is also provided with means for admitting air under pressure to the interior of the pit. This latter means is in the form of box-like castings 109 and 110 arranged at the intermediate portion and at the upper portion, respectively, of the wall. The box-like castings 109 also serve to admit water to the inner face of the front wall for maintaining the latter in a cool condition.

The box-like castings 110 are disposed in side-by-side relation and extend transversely of the front wall 100. The castings 110 are formed in two pieces and are so constructed as to provide a passage 111 for conducting air from the rear air chamber 19 to the interior of the pit.

The castings 109 are also disposed in side-by-side relation, and they extend transversely of the upper portion of the wall 100. (See also Figs. 9, 10 and 11.) These castings comprise a body member 112 carried by the upper portion of the brick work of the wall, and a cover portion 113 bolted to the bottom portion 112 and providing a downwardly-inclined support, upon which the rear grate member 41 of the overfeed grate section is slidably supported.

The body 112 and cover 113 are so formed that when assembled upon the front wall of the clinker pit, a passage 114 is provided at the air chamber side thereof for permitting air and water to flow into the hollow interior of the castings, and openings 115 are provided for permitting the flow of such air and water to the interior of the pit. Water is supplied to the interior of each of the castings 109 by means of suitable pipes 116 which are connected to a water supply manifold conduit 117 extending transversely of the rear air chamber 19.

The body member of each of the castings is provided in its interior with a basin 118 for receiving and collecting the water supplied by the pipes 116. The water overflows from the basin and through the several openings 115 and on to the interior face of the brick wall 100. The openings 115 are disposed close one to another, and as a result, the entire front wall of the pit will be covered by a sheet of water, which water will maintain the surface of the wall in a cooled condition and thereby prevent the adherence of clinkers thereto. In addition, the water will act to disintegrate any clinker.

Mechanism is disposed within the lower portion of the pit for supporting and removing the refuse therefrom. This mechanism may be of any suitable design. Preferably, however, such mechanism is in the form of a pair of grinder rolls 120 arranged within the lower portion of the pit and extending transversely of the direction of fuel feed. Shield members 121 extend from both the front and rear walls 100 and 102 and underneath the rolls 120 to provide a means to prevent the fine material from passing between the walls and rolls.

The rolls are supported by bearings 122 disposed within the end walls 101 of the clinker pit, and bearings 123 disposed within the clinker pit. The ends of the rolls extend outwardly of the clinker pit walls and are supported by bearings 124, which latter are bolted to the bottom wall of box-like supporting structures 125 and 126 extending laterally from the end walls of the clinker pit.

In the accompanying drawings, the rolls 120 are shown as being divided in the center and driven from each end by suitable pawl and ratchet mechanisms 127. Each of the pawl and ratchet mechanisms is adapted to be driven by a separate motor-driven speed reduction unit supported upon the operating floor at each end of the clinker pit. One such motor-driven speed reduction unit is shown in Fig. 1 and comprises a motor 128 driving speed reducing gearing arranged within a box 129 and a connecting rod 130 transmitting the power to the pawl and ratchet mechanism 127.

A relatively shallow ash or storage pit 135 is disposed directly beneath the clinker grinder rolls 120 for receiving the refuse discharged thereby. The ash pit comprises upright side walls 136 and 137, end walls 138, and a downwardly-inclined bottom wall 139 (see Figs. 1, 7, 12, 13, 14 and 15). The upright side and end walls 136, 137 and 138 form, in effect, downward extensions of the front wall 100, rear wall 102 and end walls 101, respectively, of the clinker pit and are in gas-tight relation with the clinker pit walls.

The lower portion of the left-hand end wall 138 is provided with a discharge opening 140 which communicates with a main sluice 141 by means of a connecting passage 142. A valve 143 controls the discharge opening and is operated by means of a hydraulic cylinder 144, which latter is controlled by a hand-operated reversing valve 145 mounted on the operating floor 73 of the furnace room (Fig. 12).

Means is provided for maintaining a body of water within the ash pit with its upper level slightly above the center line of the grinder rolls 120, the purpose of which is to provide a water seal for the lower end of the clinker pit so as to prevent the escape of air from the pit and also to submerge the rolls in water so as to maintain them at all times in a cooled condition and thereby protect the rolls from the destructive action of the burning material within the clinker pit. This means is preferably in the form of a plurality of fluid jets 146, 147 and 148, which are disposed within the bottom wall 139 of the ash pit and are arranged to direct a stream of fluid under pressure toward the discharge opening, so as to undermine and agitate the ash within the pit and aid in forcing such ash through the discharge opening.

It is to be noted at this point that insofar as certain aspects of my invention are concerned, it is not necessary that the fluid jets be disposed in the manner shown, for such jets might equally as well be disposed at other points within the ash pit and still operate to both furnish water for filling the pit and also to undermine and agitate the ash and force the latter through the discharge opening.

Conduits 149, 150 and 151 are provided for supplying fluid under pressure to the jets 146, 147 and 148, respectively. The fluid may be either water, or steam and water. I prefer, however, to use water at a suitable pressure, for example 120 pounds. Obviously, if a portion of the fluid be steam it will condense into water and aid in filling the pit. The conduits are connected to a suitable supply main 152. The flow of fluid under pressure through the supply main is controlled by a gate valve 153 operated by a hydraulic cylinder 154. A float-controlled reversing valve 155 controls the flow of an operating fluid to the opposite ends of the cylinder 154.

The operation of the reversing valve 155 is controlled by the level of the water within the ash pit. A well structure 156 is disposed adjacent the ash pit and is in open communication, by means of an opening 157, in its lower end, with the interior of the ash pit. An operating rod 158 is connected to the outer end of an actuating lever 159 of the reversing valve 155 and extends downwardly within the well structure 156. A float member 160 is secured to the lower end of the rod 158 and is movable within the well structure for moving the operating rod.

The upper level of the water within the pit is always at a predetermined fixed point which, as stated, may be slightly above the center line of the clinker rolls. This is assured by means of an overflow pipe 161 (Fig. 7), the upper end of which extends within the box-like supporting structure 125. The lower end of the overflow pipe 161 is in communication with the main sluice 141. An opening 162 in the left-hand end wall 138 of the ash pit serves to maintain communication between the box-like supporting structure 125 and the interior of the ash pit.

When it is desired to empty the ashes from the ash pit, the reversing valve 145 is operated to admit an operating fluid to the lower end of the hydraulic cylinder 144, and as a result, the valve 143 controlling the discharge opening 140 is opened. Upon an opening of the valve 143, the body of water within the ash pit immediately begins flowing through the discharge opening and carrying with it the ash. As soon as the level of the water is lowered, the float 160 moves downward with the water and operates the reversing valve 155 through the rod 158 and lever 159, to admit an operating fluid to the lower end of the hydraulic cylinder 154, and, as a result, the gate valve 153 is opened and fluid under pressure flows to the jets 146, 147 and 148.

The high-velocity fluid issuing from the jets will act to undermine and agitate the ash within the pit so that such ash will be carried out through the discharge opening 140 with the outward flow of the water. The jets also act to force the ash through the discharge opening.

It is to be observed at this point that in emptying the ash pit in the manner described, I have devised a new method for disposing of the ash from fuel burning structures of all kinds. The steps of this method are: (1) temporarily discharging the ash or refuse into an impounded body of water (water filled ash pit 135) to produce a fluent sludge-like mixture; (2) periodically discharging the mixture (by opening the discharge valve 143 and permitting the ash and water to flow through the opening 140); (3) agitating and maintaining the fluency of the mixture during the discharge period by directing additional water into the mixture at high velocity (jets 146, 147, and 148); and (4) replenishing the body of water (jets 146, 147, and 148). The water within the pit and the water from the jets acts as a vehicle for moving the ash or refuse.

The main sluice 141 is disposed in offset relation with and parallel to the ash pit 135 and its bottom wall 163 is disposed at a slightly lower level than the bottom wall of the ash pit. In Figs. 16 and 17, I have disclosed a plurality of furnaces 10 with the main sluice 141 servicing each of the furnaces. It will be observed that the main sluice extends parallel to each of the ash pits and is disposed in offset vertical relation therewith, and the bottom wall 163 of the sluice is spaced a slight distance below the bottom wall 139 of each of the ash pits. This arrangement is very compact and requires a minimum amount of head room in the basement.

It will readily be seen that due to the construction and arrangement of the overfeed grate section, the clinker pit, the ash pit and the main sluice, that I have provided combustion apparatus which requires a minimum amount of head room within the basement. The undulatory movement of the overfeed grate section provides for a more complete combustion of material prior to its deposit in the pit. The material therefore requires less time for the combustible to completely burn out and for the residue to cool. The gas-tight clinker pit walls, in conjunction with the water seal at the lower end of the clinker pit and the openings in these walls for positively introducing air for supporting combustion of the material within the pit, all act to hasten the burning of the combustible remaining in the refuse and thereby result in the shortening of the time require to reduce the ash to a suitable temperature. As the clinker grinder rolls are submerged in water, they are maintained at all times in a cooled condition thereby eliminating the requirement of a head of cooled ash adjacent to the rolls. Also, as stated, by reason of the fact that the ash pits and main sluice are disposed in offset, parallel relation they require minimum head room.

Furthermore, due to my improved method of sluicing, the ash pit is quickly and effectively emptied. Also, on acount of the extreme simplicity of the steps constituting my method, the services of a skilled operator are not required to carry out such method.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In combustion apparatus, the combination of a progressive feed stoker; a clinker pit disposed to receive the burning material and ash from the stoker and comprising immovable, gas-tight walls; mechanism disposed within the lower portion of the clinker pit for supporting and removing the ash; an ash pit disposed to receive at its upper end the ash from the ash-removing apparatus and having a discharge opening at its lower end; valve means for opening and closing the discharge opening; means for maintaining a body of water within the ash pit with its level adjacent the ash-removing mechanism so as to provide a water seal for the lower end of the clinker pit; said last-mentioned means including a plurality of fluid jets disposed within the ash pit and adapted to direct a stream of fluid under pressure against the ash so as to provide for the movement of such ash through the discharge opening when the latter is opened; and mechanism for controlling the operation of the fluid jets including means providing for the flow of fluid to said jets when the valve means is opened; and for closing said jets when the valve means is closed and the water has attained its uppermost level.

2. In combustion apparatus, the combination of stoker structure, and ash supporting and removing means receiving ash from the stoker structure; an ash pit disposed to receive at its upper end the ash discharged from said means and having a discharge opening in the lower portion thereof; valve means for controlling said discharge opening; means for maintaining a body of water within the ash pit with its level adjacent the upper portion thereof and including a plurality of fluid jets disposed within the ash pit and adapted to direct a stream of fluid under pressure against the ash within the pit for moving the same through the discharge opening when the latter is opened; and mechanism for controlling the operation of the fluid jets including means providing for the flow of fluid to the jets when the valve means is opened, and for closing the jets when the valve means is closed and the water has attained the uppermost level.

3. In combustion apparatus, the combination of stoker structure, and ash supporting and removing means receiving ash from the stoker structure; an ash pit disposed to receive at its upper end the ash discharged from said means and having a discharge opening in the lower portion thereof; valve means for controlling said discharge opening; means for maintaining a body of water within the ash pit with its level adjacent the upper portion thereof and including a plurality of fluid jets disposed within the ash pit and adapted to direct a stream of fluid under pressure against the ash within the pit for moving the same through the discharge opening when the latter is opened; and mechanism controlling the operation of the fluid jets including conduit means providing for the flow of fluid to said jets, valve means for controlling the flow of fluid through the conduit means and means responsive to the level of the water within the ash pit for controlling the operation of the last mentioned valve means.

4. In combustion apparatus, the combination of stoker structure, and ash supporting and removing means receiving ash from the stoker structure; an ash pit disposed to receive the refuse from said means and having a discharge opening in the lower portion thereof; valve means for controlling said discharge opening; fluid jet means disposed within the lower portion of the ash pit for supplying said pit with water and adapted to discharge fluid under pressure against the ash within the pit so as to move such ash through said outlet opening when the latter is opened; apparatus for controlling the operation of the fluid jet so that when the valve means controlling the outlet opening is closed, a water level will be maintained adjacent the upper portion of the pit, and when the valve means is opened the fluid jet means will operate in conjunction with the body of water already in the ash pit to force the refuse towards and through the outlet opening.

5. In combustion apparatus, the combination of stoker structure, and ash supporting and removing means receiving ash from the stoker structure; an ash pit disposed to receive at its upper end the ash discharged from said means and having a discharge opening at the lower portion thereof; valve means for controlling said discharge opening; means for maintaining a body of water within the ash pit with its level adjacent the upper portion thereof and including a plurality of fluid jets disposed to direct a stream of fluid under pressure toward the discharge opening; and mechanism for controlling the operation of the fluid jets including means providing for the flow of fluid to the jets when the valve means is opened and for closing the jets when the valve means is closed and the water has attained the desired level.

6. The combination with a furnace having a clinker pit disposed transversely thereof and mechanism for supporting and removing the ash from the pit; of an ash pit extending transversely of the furnace, arranged below said mechanism, and constituting substantially a vertical continuation of the clinker pit; a sluice-way extending substantially parallel to the ash pit and having its bottom arranged sufficiently below the bottom of the ash pit as to provide for drainage of the latter into the former; and means providing for sealing and sluicing the ash pit including a passage affording communication between one end of the ash pit and the sluice-way, valve means for said passage, means for admitting water to the ash pit including sluicing jet means and means responsive to discharge of water from the ash pit to render the water-admission means effective.

7. In combustion apparatus, the combination of stoker structure, and ash supporting and removing means receiving ash from the stoker structure; an ash pit disposed to receive at its upper end the ash discharged from the means and having a discharge opening in the lower portion thereof; valve means for controlling said discharge opening; means for maintaining a body of water within the ash pit with its level adjacent the upper portion thereof and including a plurality of fluid jets disposed within the pit and adapted to direct a stream of fluid under pressure against the ash within the pit so as to move such ash through the discharge opening; mechanism for controlling the operation of the fluid jets including means providing for the flow of fluid to the jets when the valve means is opened and for preventing the flow of fluid through the jets when the valve means is closed and the water has attained the desired level; a main sluice disposed substantially parallel to and in off-set relation with the longitudinal center-line of the ash pit and having its bottom wall disposed at a slightly lower level than the bottom of said discharge opening; and conduit means connecting the discharge opening with the main sluice.

8. In combustion apparatus, the combination of a plurality of fuel-burning structures disposed in side-by-side relation; ash supporting and removing means disposed to receive the ash from each of the stoker structures; an ash pit disposed transversely beneath each of the stoker structures and arranged to receive at its upper portion the ash discharged from its respective ash supporting and removing means; each of the ash pits having a discharge opening in the lower portion thereof and comprising side walls and a bottom wall; a main sluice for servicing all of the stoker structures and disposed substantially parallel to and in offset relation with the longitudinal centerlines of the ash pit, and having its bottom wall arranged at a slightly lower level than the discharge openings of the ash pits; and conduit means connecting each discharge opening with the main sluice.

9. The combination with a progressive feed stoker, and a clinker pit disposed to receive the refuse from said stoker and comprising upright gas-tight walls and ash supporting and removing means within the lower portion thereof; of an ash pit disposed to receive the refuse from the ash supporting and removing means and including gas-tight walls connected in gas-tight relation with the walls of the clinker pit and having in the lower portion thereof a discharge opening; valve means for opening and closing the discharge opening; means for filling the ash pit with water so as to provide both a water seal for the clinker pit and a body of water into which the refuse from the ash supporting and removing means is deposited; and means providing for the simultaneous discharge of water and refuse through the discharge opening in the ash pit; said last-mentioned means including fluid jet means for directing the flow of fluid into the ash and water within the ash pit so as to aid in the discharge of such ash and water through the discharge opening.

10. The combination with a progressive feed stoker, and a clinker pit disposed to receive the refuse from the stoker including gas-tight walls and means within the lower portion of the pit for supporting and removing the ash; of an ash pit disposed to receive the refuse discharged from the ash supporting and removing means and including gas-tight walls connected to the clinker pit walls in gas-tight relation therewith and having in the lower portion thereof a valve controlled refuse discharge opening; means for filling the pit with sufficient water to at least partially submerge the refuse supporting and removing means in the clinker pit; and means providing for the discharge of water and refuse through the valve controlled discharge opening.

11. The method of removing ash and refuse from a fuel burning structure which consists in, first, temporarily depositing the ash, as the latter is discharged from the structure, in a water filled storage place so as to provide a fluent mixture; next, in causing the gravitational discharge of the mixture, and, at the same time, assisting such discharge by agitating and maintaining the fluency of the mixture by directing into the mixture additional water at high velocities; and, after discharge, in refilling the storage place with water.

12. The method of disposing of ash and refuse from combustion apparatus which consists in, first, supplying ash and refuse from such apparatus into an impounded body of water; next, in discharging the body of water and the ash and refuse mixed therewith, and, at the same time, applying water jets interiorly of the body of water for agitating the latter and the ash and refuse to secure more effective discharge; and, after discharge, in replenishing the body of water.

13. The method of disposing of ash and refuse from combustion apparatus which consists in, first, supplying ash and refuse from such apparatus into an impounded body of water; next, in discharging the body of water and the ash and refuse mixed therewith, and, at the same time, in applying water jets interiorly of the body of water and in the direction of the discharging stream of water and ash and refuse for agitating the latter so as to secure more effective discharge; and, after discharge, in replenishing the body of water.

14. The method of removing ash and refuse from a furnace and transferring the same to a final point of discharge which consists in, first, causing the ash to be deposited into an impounded body of water to provide a fluent, sludge-like mixture; next, in providing a rapidly moving stream of water emptying into the final point of discharge; next, in releasing in a relatively short period of time the impounded mixture into the stream, and, at the same time, directing high-velocity jets of water into the mixture to agitate and assist in its movement; and, after discharge, in replenishing the body of water.

15. The method of disposing of ash and refuse from combustion apparatus which consists in, first, providing a stream of water adjacent to the apparatus; next, in supplying ash and refuse from the apparatus into an impounded body of water; next, in discharging the body of water and the ash and refuse mixed therewith into the stream of water, and, at the same time, in applying water jets interiorly of the body of water for agitating the latter to secure more effective discharge; and, after discharge, in replenishing the body of water after each discharge period.

In testimony whereof, I have hereunto subscribed my name this 1st day of July, 1929.

ROBERT A. FORESMAN.